THERMOELECTRIC SYSTEMS

Filed Sept. 27, 1957 3 Sheets-Sheet 1

WITNESSES
Edwin E. Bassler
Leon M. Garman

INVENTOR
Shepard Bartnoff
BY
Donald J. Smith
ATTORNEY

United States Patent Office 3,008,890
Patented Nov. 14, 1961

3,008,890
THERMOELECTRIC SYSTEMS
Shepard Bartnoff, Pittsburgh, Pa., assignor to Westinghouse Electric Corporation, East Pittsburgh, Pa., a corporation of Pennsylvania
Filed Sept. 27, 1957, Ser. No. 686,779
5 Claims. (Cl. 204—193.2)

The present invention relates to systems for the direct conversion of heat into electrical energy and particularly to systems of the character described adapted for use in conjunction with a nuclear power plant or other centralized source of heat.

Numerous schemes have been proposed heretofore for converting heat or other forms of radiant energy directly into electrical power. Such schemes frequently attempted to utilize the well known Seebeck or thermocouple effect whereby an electric current is generated by maintaining the junctions of the thermocouple at relatively different temperatures. A large number of such thermocouples may be connected into an arrangement where some of their junctions are maintained at a lower temperature and the remaining junctions thereof at a higher temperature. In this manner, attempts have been made to assemble large numbers of segments of the dissimilar materials comprising the thermocouples into a so-called thermopile by joining the dissimilar segments in alternation to comprise the hot and cold junctions thereof. Inasmuch as the electrical output from a single thermocouple is exceedingly small, an inordinate number of such thermocouples, when so assembled, would be required in order to produce a significant amount of electric power. The number of such thermocouples comprising the thermopile can be reduced to a practicable number only by maintaining extreme differences in temperature between the hot and cold junctions of the thermopile in order to generate usable quantities of electrical energy. Moreover, unless the number of individual thermocouples are so reduced, the joule losses in the thermopile, i.e., the irreversible, second order current heating losses, renders the thermopile so inefficient as to obviate its practical value. On the other hand the provision of dissimilar thermoelectric elements having a relatively high electrical conductivity usually resulted in concomitant high thermal conductivity. This latter characteristic of course mitigated against the maintenance of adequate temperature differentials in prior proposed systems.

Until the present invention, no workable scheme has been disclosed for arranging a thermopile of the character described such that a significant quantity of electrical energy can be generated therein. Prior schemes have been found to be inadequate due to the difficulty of maintaining a workable and adequate temperature differential between the hot and cold junctions of the thermopile. The spatial arrangement of the hot and cold junctions has been complicated by the excessive number of thermocouples which would be required to generate electrical power in usable quantities. As a result, no arrangement has heretofore been proposed for conveniently and adequately segregating the aforesaid hot and cold junctions and for efficiently supplying heat to the hot junctions of the thermopile while cooling the cold junctions thereof. Moreover, the large number of series-connected pairs of the dissimilar materials comprising previously proposed thermopile arrangements would so increase the ohmic resistance thereof that the necessarily increased size of the thermopile, which would be required to compensate this resistance, would render the adequate heating and cooling of the hot and cold junctions, respectively, thereof virtually impossible.

In view of the foregoing it is an object of the invention to provide novel and efficient means for converting heat directly into electricity.

Another object of the invention is to provide a thermopile arrangement which can be fabricated and assembled with relative ease and with a minimum of component parts.

Another object of the invention is to provide a novel and efficient thermopile arrangement adapted in one application thereof for use with a source of nuclear power.

A further object of the invention is to provide a thermopile arrangement wherein the hot and cold junctions thereof, respectively, are adapted for being heated and cooled by either gaseous or liquid heat transfer media.

Still another object of the invention is to provide a novel and efficient fuel element adapted for use with a nuclear reactor and having means associated therewith for converting at least part of the heat developed by the chain reaction, which is sustained within the reactor, directly into electricity.

A still further object of the invention is to provide heat exchanging means adapted for the transfer of heat, between liquid, gaseous, and solid materials, or combinations thereof, wherein at least a portion of the heat being transferred is converted directly into electricity.

Yet another object of the invention is to provide a novel and efficient fuel element assembly adapted for use with a nuclear power reactor, which assembly is furnished with means for electrically connecting the component thermoelectric elements thereof into a thermopile arrangement.

These and other objects, features, and advantages of the invention will be made apparent during the ensuing description of exemplary forms thereof with the description being taken in conjunction with the accompanying drawings wherein.

In accordance with the invention, a thermopile is arranged in conjunction with a plurality of heat exchanging means, with the number of the heat exchanging means being equivalent to the number of pairs of dissimilar thermoelectric materials comprised in a thermopile. More specifically, a single pair of the segments of dissimilar materials comprising the thermopile are arranged in thermoelectric relationship upon one of the aforesaid heat exchanging means. In one example of the invention, each pair of the aforesaid segments are disposed within the casing or cladding of a generally tubular heat exchanging element, and suitable electrical connections are provided among a plurality of such elements in order to connect the pairs of thermoelectric materials to form a thermopile. In furtherance of this purpose, the individual tubular elements of the thermopile are arranged such that all of the hot junctions thereof will be confined to one surface, for example, the interior surface of the casing and thus are adapted for heating by a source contained within the casing, or alternatively, by heated fluid media passing therethrough. On the other hand, the cold junctions of the thermopile are confined to the other surface of the tubular casing, that is to say, the outer surfaces thereof, and thus are arranged for convenient cooling by a fluid flowing exteriorly of the tubular casings. Therefore, a comparatively large number of the aforesaid tubular casings can be adapted for suspension within an enclosed vessel, for example, and suitable well-known means can be utilized for segregating the coolant passing around the tubes from the source of heat or from the heated fluid contained within or passing through the tubes. Alternatively, the coolant fluid and the source of heat can be segregated by means arranged according to the invention and presently to be described.

In other aspects of the invention, it is contemplated that the aforesaid tubular casings be arranged such that the hot junctions of the thermopile are disposed exteriorly of the casings while the cold junctions are confined to the interior surfaces thereof. In this latter arrangement, the coolant material accordingly is passed through the interior of the tubular casings while the heating material is maintained outside of the tubular casings. As will be shown hereinafter, this latter arrangement is found to be convenient in those applications wherein a smaller quantity of cooling medium is required in comparison with that of the heating medium.

Figures 1, 2, 4, 5, 6:
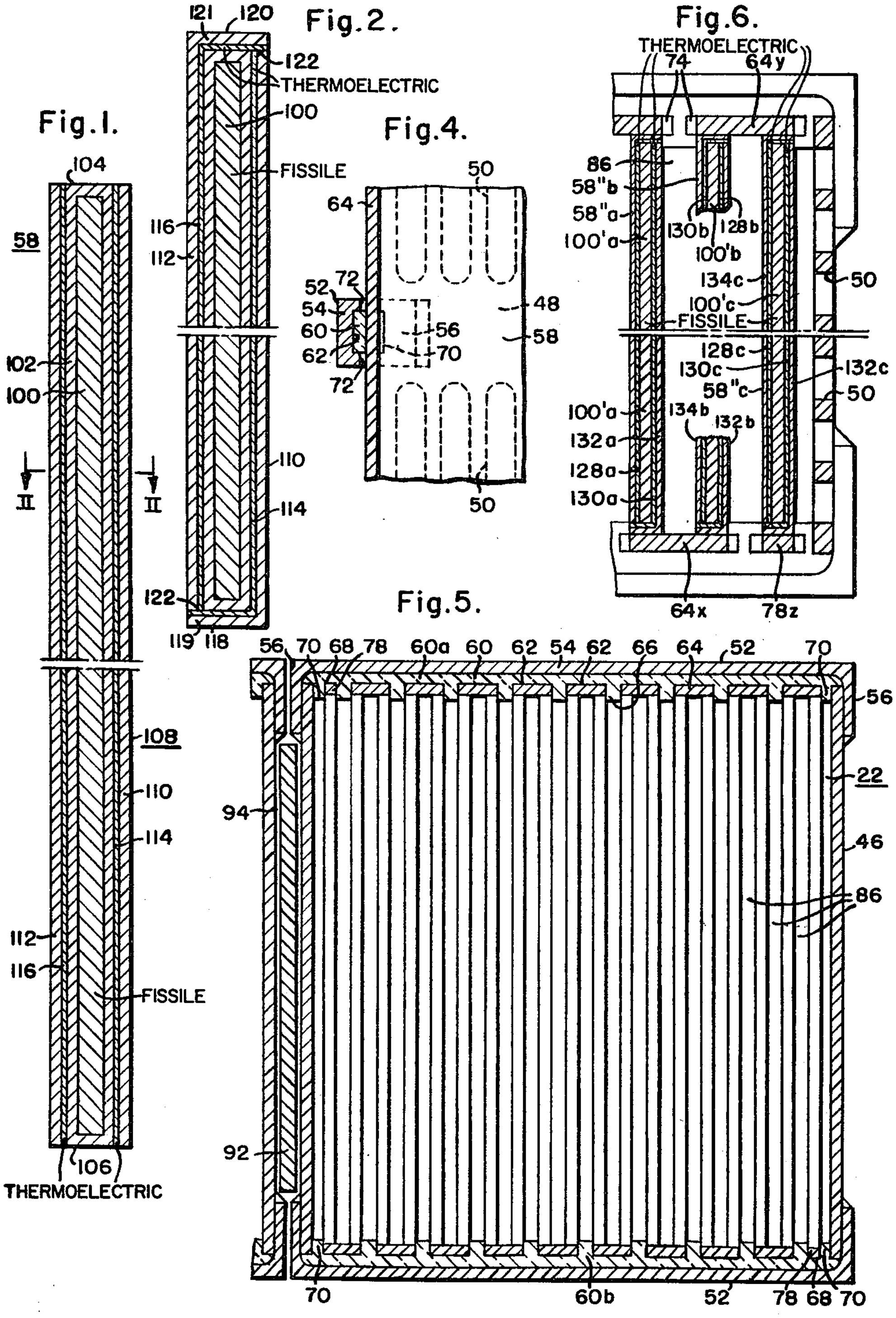
FIGURE 1 is a longitudinal sectional view of a plate type fuel element adapted for use in conjunction with a nuclear reactor and arranged according to the present invention.
FIG. 2 is a cross sectional view of the fuel element of FIG. 1 taken along reference lines II—II thereof.
FIG. 4 is a partial longitudinal sectional view of the fuel element assembly of FIG. 3 taken along reference lines IV—IV thereof.
FIG. 5 is a cross sectional view of the fuel element assembly of FIG. 3 taken along reference lines V—V thereof.
FIG. 6 is a partial cross sectional view of the assembly of FIG. 3 taken along the lines VI—VI thereof.
Figure 3:
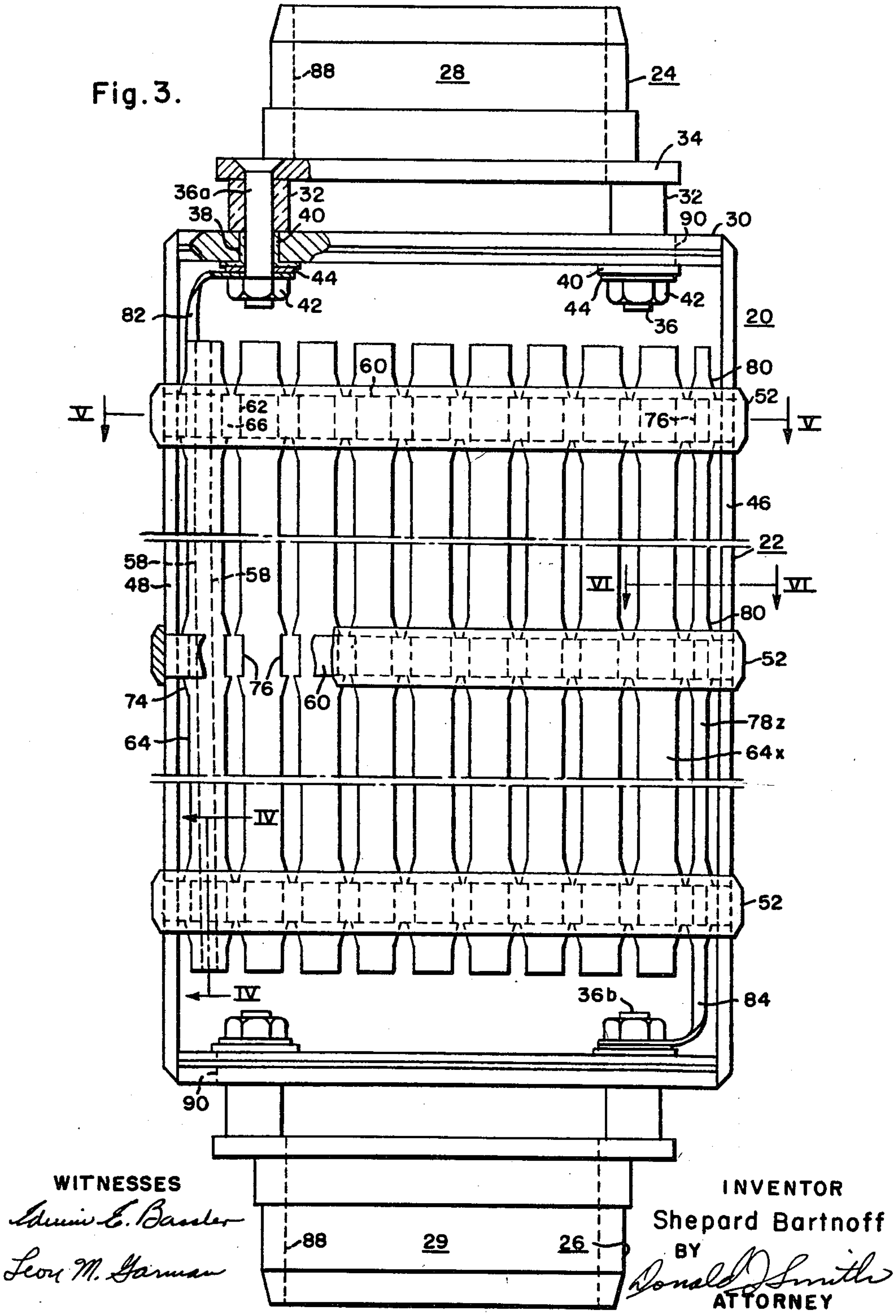
FIG. 3 is an elevational view, partially sectioned, of a plate type fuel element assembly adapted for use within a nuclear reactor.

Referring now more particularly to FIGS. 3 and 4 of the drawings, an exemplary form of the invention, as shown therein, is arranged in association with a fuel element assembly 20 which is adapted for suspension in the core (not shown) of a neutronic reactor. In such a reactor, a plurality of these fuel element assemblies 20 are employed with each of the assemblies containing a quantity of fissible material, for an example, one of the isotopes U–235, U–233 or Pu–239 or combinations thereof. The number of these fuel element assemblies and the amount of fissile material contained within each are selected such that at least a critical mass of the material, i.e. a quantity sufficient to sustain a nuclear chain reaction therewithin, is contained within the aforesaid neutronic reactor core. Therefore, the size of the core is still somewhat dependent upon the total power level or heat output thereof and both the total number and size of the fuel element assemblies 20 can be varied within limits to meet the power requirements of a particular neutronic reactor. These and other structural details of a specific embodiment of a neutronic reactor are given in a copending application of Robert J. Creagan, "Neutronic Reactor," Serial No. 686,778, filed September 27, 1957, and assigned to the assignee of the present application and accordingly, further elaboration thereon is deemed unnecessary.

Turning now more specifically to FIGS. 3 and 4 of the drawings, the plate type fuel element assembly 20 as illustrated therein comprises a fuel element bundle 22 and a pair of flow nozzle assemblies 24 and 26 which are individually secured to the extremities of the fuel element bundle 22. Each of the flow nozzle assemblies 24 and 26 includes a flow nozzle 28 and a mounting plate 30, spaced therefrom by means of a plurality of tubular electrically insulating spacers 32. The spacers 32 can be formed from a suitable ceramic material such as aluminum oxide or other relatively stable insulating material.

The nozzle 28 which terminates at its inward extremity in a flange 34 is secured to its mounting plate 30 by means of a plurality of mounting bolts 36 inserted through suitable apertures in the flange 34. Each of the mounting bolts 36 is further inserted through an aperture 38 of the mounting plate and is electrically insulated therefrom through the intervention of an insulating grommet 40 fabricated desirably from the same material as that of the spacers 32. Each mounting bolt 36 is then secured in this position in a well-known manner by means of a nut 42 and washer 44. As illustrated in FIG. 3, each spacer 32 is formed with a larger diameter than that of the adjacent grommet 38, in order to preserve its spacing function relative to the nozzle 28 and its mounting plate 30. For purposes hereinafter to be pointed out, each flow nozzle 28 is thus electrically insulated from its mounting plate 30 and from other structural components of the fuel element assembly 20 through the interposition of the insulating spacers 32 and the insulating grommets 40.

The mounting plates 30 of the flow nozzle assemblies 24 and 26, respectively, are joined in opposed alignment by means of a pair of structural plates 46 and 48. These structural plates extend along the length of the fuel element bundle 22 and protrude slightly in the longitudinal direction thereof in order to space the mounting plates 30 from the respective ends of the fuel bundle. As shown in FIG. 5 of the drawings, these plates further extend substantially along the width of one side of the fuel element bundle 22, which is approximately square in configuration in this example. In order to minimize absorption of neutrons by the structural plates 46 and 48, which neutrons are emitted from the fissioning atoms of the nuclear fuel, a plurality of closely spaced elongated slots 50 are cut into the structural plates 46 and 48. These slots serve the additional function of decreasing the weight of the fuel element assembly and of supplying coolant fluid to channels 94 through which adjacent control elements 92 are inserted in a manner presently to be described.

The aforementioned fuel element bundle, which includes a plurality of thermoelectric fuel elements presently to be described, is secured to the structural plates 46 and 48 by a plurality of metallic straps 52, with three of such straps being shown in this example of the invention. Obviously, additional straps can be utilized depending upon the length of the fuel element bundle 22 and the weight thereof. More specifically, each of the straps 52 comprises an elongated back portion 54 and perpendicular leg portions 56 located at each extremity of the back portion 54. The leg portions 56 of each strap 52 are secured to the structural plates 46 and 48, respectively, by means of welding or by other suitable well known means. The straps 52 thus serve to space and to stabilize the structural plates 46 and 48 along the length thereof and to form a cage, as it were, for supporting a plurality of plate type fuel elements 58.

As indicated heretofore, each of these fuel elements 58 contains a pair of dissimilar thermocouple materials, and suitable means, arranged according to the present invention and presently to be described, are provided for connecting a plurality of these fuel elements in an electrical series. Additionally, electrically insulating supporting means are associated with each of the straps 52 for supporting the fuel elements 58 within the assembly 20.

As bettter shown in FIGS. 4 to 6 of the drawings, one form of such insulating supporting means adapted for use with each of the straps 52 comprises an elongated electrically insulating strip 60 fabricated, for example, from one of the aforementioned ceramics and having a plurality of transverse grooves or indents 62 formed therein. Each of the grooves 62 is adapted to receive an electrically conductive strip 64 secured to the lateral edges of a pair of adjacent plate type fuel elements 58. As shown in FIG. 5 of the drawings, a plurality of such conductive strips 64 when thus secured to the edges of the fuel element 58 are arranged to connect these fuel elements into an electrical series. The grooves 62 formed as aforesaid in the strip 60 form a number of substantially equally spaced teeth 66 upon the inward surface of the strip 60. These teeth 66 thus are inserted individually between adjacent pairs of the fuel elements 58 and, accordingly, serve to maintain a predetermined spacing therebetween. In this example of the invention each pair of opposing insulating strips 60*a* and 60*b* are provided with a relatively narrow groove 68 at diagonally opposed ends thereof in order to receive the free lateral edge of the outermost plates, respectively, of the fuel bundle 22. Adjacent these outermost plates, an additional pair of teeth 70 are provided respectively adjacent the ends of each of the insulating strips 60 in order to maintain a proper spacing between the structural plates 48 and 46 and the said outermost fuel plates. With this arrangement of straps 54 and insulating strips 60, it will be apparent that each of the fuel element plates 58 are insulated from the metallic structural components of the fuel element assembly 20 and from one another save through their electrical series connections comprising the conductive strips 62.

Each insulating strip 60 is mechanically supported within its associated strap 54, as better shown in FIG. 4, by being inserted between and engaging a pair of inwardly extending shoulders 72 extending substantially along the length of the strap 52 and secured thereto adjacent the lateral edges thereof, respectively. Accordingly, these insulating strips 60 are stabilized against lateral movement thereof and, consequently, against breakage by means of its associated strap 52. In order to secure each adjacent pair of fuel elements 58 against longitudinal movement thereof relative to each strap 52 and associated components, each conductive strip 64 is formed with a plurality of widened portions 74 which correspond in number to that of the pairs of opposing straps 52. A pair of opposed indents 76, as better shown in FIG. 3 of the drawings, is cut into the lateral edges of the aforesaid widened portion and extend therein desirably to the lateral surfaces of the associated fuel elements 58.

The distance between the innermost edges of the indents 76 is made equivalent to the width of the transverse grooves 62 (FIG. 5) of the insulating strip 60, in order that the associated portion of the conductive strip 64 can be inserted therein and that the adjacent teeth 66 of the strip 60 seat relatively closely within the indent 76. Accordingly, each of the conductive strips 64, being so formed, and the fuel elements 58 secured thereto are prevented thereby from moving transversely of the connecting straps 52 and their associated insulating strips 60, or, in other words, the fuel elements 58 are prevented from moving longitudinally of the fuel bundle 22 and the other components of the fuel element assembly.

As better shown in FIGS. 3, 5 and 6 of the drawings, one lateral edge of each of the outermost fuel elements of the series-connected array of fuel elements comprising the bundle 22 is secured to a relatively narrow conductive strip 78. The conductive strips 78 likewise extend substantially along the length of the outermost fuel elements 58 and are provided with a like plurality of widened portions 80 adjacent the connecting straps 52. Each of the widened portions 80 similarly is provided with a pair of the indents 76 to enable the conductive strips 78 to be inserted within the groove 68 of each of the insulating strips 60. When fitted in this manner, the widened portions 80 operate as described in connection with the widened portions 74 of the conductive strip 64 to prevent longitudinal movement of the associated fuel elements 58.

In order to establish external electrical contact to the series connected fuel elements comprising the fuel bundle 22, the last-mentioned conductive strips 78, terminate in an electrical conductor 82 or 84, which are secured between the nut 42 and washer 44 of one of the mounting bolts 36 of the flow nozzles 28, respectively. In this manner, an electrical circuit is completed from the outermost fuel plates of the series-connected fuel elements 58 to the flow nozzles 28, respectively, via the mounting bolts 36*a* and 36*b*, respectively. In order to minimize ohmic resistance in this system, additional electrical conductors, not shown, can be connected from the aforesaid conductive strips 78 of the outermost fuel plates to those mounting bolts adjacent respectively to the aforesaid bolts 36*a* and 36*b*, in an electrical parallel arrangement.

When the plate type fuel elements 58 are mounted in this fashion, a plurality of flow passages 86 are provided therebetween for the passage of a suitable coolant fluid, for example, a high boiling organic material such as phenyl, diphenyl, or triphenyl, or a gaseous coolant such as carbon dioxide and the like. Any suitable one of these coolants or other coolant materials, can be employed as long as it possesses the characteristic of electrical nonconductivity to avoid shorting out the individual thermoelectric fuel elements 58.

As shown in FIG. 3 of the drawings, the aforesaid coolant fluid is admitted into each fuel element assembly 20 by means of a longitudinal channel 88 provided in each of the flow nozzles 28 and 29, from which channels access and egress is provided for the coolant fluid by means of an aperture 90 formed substantially centrally in each of the mounting plates 30. When so arranged, a plurality of the fuel element assemblies 20 are adapted for suspension within a neutronic reactor core (not shown) such as that illustrated in the aforesaid copending application of Robert J. Creagan. When arranged in this fashion, adjacent ones of these fuel element assemblies can be spaced sufficiently to provide channels within the reactor core for the insertion of a suitable number of cruciform control rods as described in the aforesaid application. Alternatively, as is noted heretofore, a plurality of plate type control elements 92 can be employed and can be inserted between closely spaced adjacent pairs of the fuel element assemblies 20, as illustrated in FIG. 5 of the drawings, by insertion into a channel 94 formed therebetween. The control elements 92 can be withdrawn and inserted into the aforesaid neutronic reactor core in any suitable manner, for an example, that described in the aforesaid copending application. When thus arranged in the neutronic reactor core, the plurality of fuel element assemblies 20 are connected into electrical series in any convenient manner, for an example, that described in a copending application of William E. Shoupp, entitled "Electric Generating Systems," Serial No. 686,777, filed September 27, 1957, and assigned to the assignee of the present application.

Turning now to FIGS. 1, 2 and 6 of the drawings, the structural details of the individual thermoelectric fuel elements 58 are shown more fully therein. Each fuel element 58, then, comprises a fuel plate 100 containing a quantity of one of the fissile isotopes U–233, U–235 or Pu–239, or combinations thereof inter se or with a fertile material such as uranium 238 or thorium 232. In other applications of the invention, the fuel plate 100 may comprise a nuclear fuel consisting essentially of the fertile material, that is a material such as U–238 or thorium 232, or combinations thereof, which is capable of being converted into one of the aforesaid fissile isotopes by neutronic absorption and radioactive decay. Whether a fissile or a fertile material is employed depends upon whether the fuel element assembly is employed in the "seed" or enriched portion of a reactor core, in the "blanket" or fertile portion thereof, or in a substantially uniform core. The considerations dictating the placement fo fuel elements in this manner and other details of operational theory concerning neutronic reactors are set forth in the aforesaid copending application of Robert J. Creagan and in Enrico Fermi and Leo Szilard, Patent No. 2,708,656, dated May 17, 1955.

In this example of the invention, the fuel plate 100 is approximately 100 inches in length, six inches in width and a nominal 50 mils in thickness. In one form of neutronic reactor, approximately 19 fuel elements 58 are suspended within each assembly 20 and approximately 34 such assemblies are mounted within the reactor core.

An additional number of fuel element assemblies 20 can be employed depending upon the fuel requirements of the neutronic reactor.

In this arrangement, then, each of the fuel plates 100 is encapsulated within a casing or cladding layer 102 fabricated from zirconium, one of its alloys, stainless steel, or other structural material having a relatively low neutron absorptional cross section. A portion of the casing layer 102 is extended around the top and bottom edges 104 and 106, respectively, of the fuel element 58 in order to enclose completely the nuclear fuel material contained therewithin. This has been found highly desirable in order to prevent corrosion or erosion of the fuel plate 100 by the coolant material and to prevent the accumulation of highly radioactive fission products and other radioactive materials within the coolant.

Spaced outwardly from the casing layer 102 is a bipartite second casing layer 108 consisting of a pair of cladding portions 110 and 112 disposed on opposed lateral surfaces of the fuel element 58. Interposed between the encapsulating layer 102 and the outer casing portion 110 is a first layer of thermoelectric material 114. Likewise arranged between the other outer casing portion 112 and the encapsulating layer is a layer 116 of dissimilar thermoelectric material. The pair of thermoelectric layers 114 and 116 thus forming part of the casing or cladding of the fuel element 58 are coupled electrically by means presently to be described to form a thermoelectric junction therebetween. One side of each of the outer casing portions 110 and 112, respectively, and the associated thermoelectric layers 114 and 116 are extended around opposed lateral edges 118 and 120 (FIG. 2) of the fuel plate 100. The associated edge portions 119 and 121 of the outer casing portions 110 and 112, accordingly, serves to provide electrical connection from the thermocouple junctions forming a part of each of the fuel elements 58 to the conductive strips 64 or 78 as better shown in FIG. 6 of the drawings.

These lateral edge portions 119 and 121 are secured to the conductive strips as by welding or brazing or by any other suitable means adapted for providing an electrical connection therebetween. The lateral edge portions 119 and 121 of the fuel element 58 serve the additional function in conjunction with the lateral edge portions of the adjacent thermoelectric layers of providing additional cladding at the lateral edges 118 and 120 of the fuel plate 100. More importantly, the lateral edge portions of the thermoelectric layers 114 and 116 as well as the remaining portions of layers serve to prevent direct electrical contact between the inner or encapsulating layer 102 and the bipartite outer casing layer 108. Any localized shorting occasioned at the junctions 122 between the dissimilar thermoelectric layers 114 and 116 has been determined to be negligible. The upper and lower edge portions 104 and 106 of the fuel element 58 may be doubly encapsulated, as described heretofore in connection with the lateral edge portions 118 and 120 thereof by a similar treatment, such as that provided at the upper and lower edges 124 and 126 of another form of plate type fuel element 58' shown in FIG. 9 of the drawings and presently to be described in detail.

In this example of this invention, the fuel plate is provided with a thickness of approximately 50 mils, the encapsulating layer 102, the outer casing layer portions 110 and 112 are formed with thickness in the range of 7 to 15 mils, and each thermoelectric layer 114 and 116 when formed from one of those materials presently to be described is provided with a thickness of 5 to 10 mils. When a plurality of fuel elements 58 having these dimensions are assembled within the fuel element assembly 20, the flow passages 86 formed therebetween are approximately 225 mils in width.

When formed in this fashion, the encapsulating layer 102 of the fuel element 58 electrically connects the hot junction between the dissimilar thermoelectric layers 114 and 116 and, in furtherance of this purpose, each thermoelectric layer 114 and 116 is disposed upon the encapsulating layer 102 by any suitable means designed to form an electrically thermally conductive bond therebetween. Methods for so joining the encapsulating layer 102 and the thermoelectric layers 114 and 116, are discussed in application entitled "Thermoelectric Systems," Serial No. 686,780, filed September 27, 1957, and assigned to the present assignee. The encapsulating layer 102, being deployed in heat conductive relationship with the fuel plate 100 then operates to maintain the aforesaid hot junction at a relatively high temperature. As is well known, the heat supplied thereto is developed within the fuel plate 100 as a result of the self-sustaining chain reaction which is capable of being maintained within the neutronic reactor.

Figures 7, 8, 9, 10:
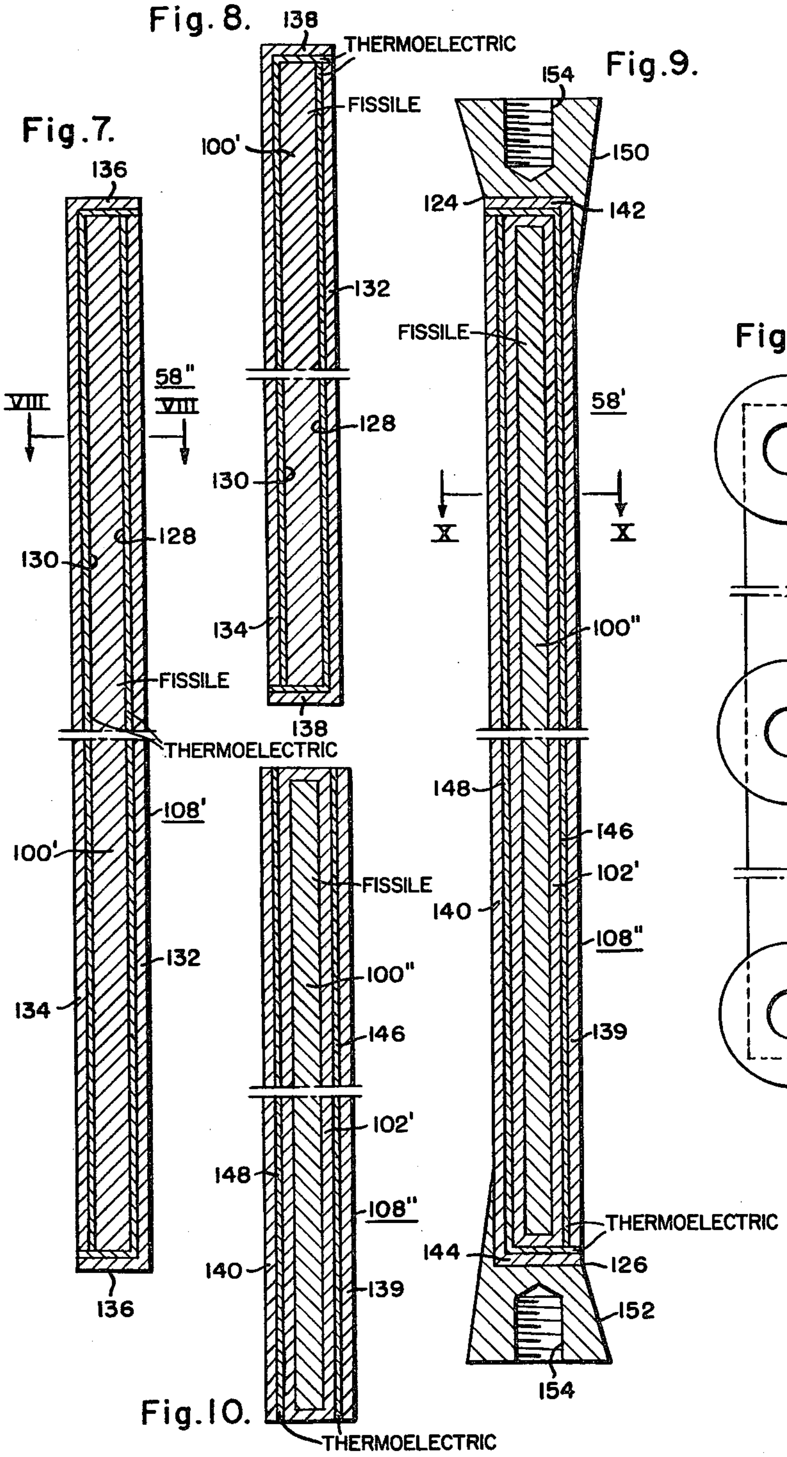
FIG. 7 is a longitudinal sectional view of another form of plate type fuel element arranged in accordance with the present invention.
FIG. 8 is a cross sectional view of the fuel element of FIG. 7 taken along reference lines VIII—VIII thereof.
FIG. 9 is still another longitudinal sectional view of a fuel element arranged according to the teachings of the invention.
FIG. 10 is a cross sectional view of the fuel element of FIG. 9 taken along reference lines X—X thereof.

Alternatively, as illustrated in FIGS. 7 and 8 of the drawings, the encapsulating layer 102 of the fuel element 58'' shown therein can be omitted and in those cases where the fuel plate 100' is a conductive material, such as metallic uranium or one of its alloys, dissimilar thermoelectric layers 128 and 130 respectively, can be bonded directly to the opposed lateral surfaces of the fuel plate 100'. A bipartite cladding layer 108' is then bonded to all of the exposed outer surfaces of the thermoelectric layers 128 and 130. In furtherance of this purpose, each of the cladding portions 132 and 134 comprising the bipartite cladding layer 108' are provided with adjacent turned over edge portions 136 and 138, with the edge portions 136 covering the top and bottom edges, respectively, of the fuel plate 100' and with the edge portions 138 covering the lateral edges, respectively, of the fuel plate 100'. The casing portions 132 and 134 are bonded to the thermoelectric layers 128 and 130, respectively, in any convenient manner, such as that described in applicant's aforesaid copending application, and which is applicable for forming a hermetic seal therebetween.

Considering now FIGS. 6, 7 and 8 of the drawings, means including the conductive strip 64 for connecting a plurality of fuel elements such as the fuel elements 58'' in electrical series are illustrated therein. Although either the fuel elements 58 or 58'' can be utilized in this arrangement, the latter have been shown in FIG. 6 for simplicity. As is noted heretofore the hot junctions of the thermocouple associated with each of the fuel elements 58'' are joined by the conductive fuel plate 100'. The cold junctions of the thermoelectric materials are coupled by means of the bipartite casing 108', the component parts of which are secured in electrically conductive relationship to the conductive strips 64 or 78. In this arrangement of the invention illustrated in FIG. 6 of the drawing, the thermoelectric layers 128 and 130 are relatively reversed in position with respect to adjacent fuel elements 58'' in order that a dissimilar pair of these layers can be connected electrically by the conductive strip 64 to form the cold junctions of the thermopile arrangement.

Specifically, the thermoelectric layers **128*a* and 130*a* of the fuel element 58''*a* are disposed on relatively different lateral surfaces of the fuel plate 100'*a*, than are those thermoelectric layers 130*b* and 128*b* of the adjacent fuel element 58''*b*. In furtherance of the same purpose, the thermoelectric layers 128*c* and 130*c* of the fuel element 58''*c* are arranged in the same relative positions as that of the thermoelectric layers 128*a* and 130*a* of the first-mentioned fuel element 58''*a*. Consequently, when the fuel elements 58''*a* are so arranged, the thermoelectric layer 130*a* of the fuel element 58''*a* is coupled in electrical series with the dissimilar thermoelectric layer 128*b* of the adjacent fuel element 58''*b*, by means of the casing portion 132*a* of the fuel element 58''*a*, the conductive strip 64*x* and the casing portion 132*b* of the fuel element 58''*b*. Continuing the series-connected electrical circuit still further, the dissimilar thermoelectric layers 128*b* and 130*b* of the fuel element 58''*b* are connected electrically to form a hot junction therebetween by means of the conductive fuel plate 100'b**.

The succeeding cold junction of the thermopile circuit then is formed by the thermoelectric layer 130b of the fuel element 58''b and the dissimilar thermoelectric layer 128c of the adjacent succeeding fuel element 58''c, which last-mentioned dissimilar layers are coupled through the casing portion 134b of the fuel element 58''b, the conductive strip 64y and the casing portion 134c of the fuel element 58''c. The thermoelectric layers 128c and 130c are coupled to form a hot junction therebetween and to place the same in electrical series with the thermopile circuit thus far described by the fuel plate 100''c of the fuel element 58''c. At this point in the thermopile circuit, an external connection is made by means of the conductive strip 78z secured as described heretofore to the casing portion 132c of one of the outermost fuel elements, that is to say, the fuel element 58''c of the thermopile arrangement.

As better shown in FIG. 3 of the drawings and as described in connection therewith, the conductive strip 78z is coupled to the electrical conductor 84 and thence to the flow nozzle 29 of the lower flow nozzle assembly 26. The thermopile circuit is completed through all of the fuel elements 58 comprising the fuel element bundle 22 and the other external lead thereto is brought out through the electrical conductor 82 associated with the flow nozzle assembly 24. As a result, when a plurality of fuel element assemblies 20 are disposed within a neutronic reactor core, the same can be coupled in electrical series by securing electrical conducting means to the flow nozzles 28 and 29 of each fuel element assembly 20, for an example, in the manner described in the aforesaid copending application of William E. Shoupp.

In the arrangements of the invention described heretofore, the dissimilar thermoelectric materials are selected desirably, but not necessarily, from a group of mixed valence inorganic compounds such as those described in a copending application of Robert R. Heikes and William D. Johnston entitled "Thermoelements and Devices Embodying Them," filed April 16, 1957, Serial No. 653,245, now Patent No. 2,921,973, and assigned to the present assignee. As stated in the latter-mentioned application, some of these compounds have the general formula $$Li_mT_{(1-m)}X$$

where T represents at least one transition metal from the group including manganese, iron, nickel, cobalt, copper, and zinc, X represents a chalcogenide selected from the group comprising oxygen, sulphur, selenium, and tellurium, and $m$ has a value not exceeding .1 and not less than .001. A homogeneous solid of this composition can be employed as the positive element of the pair of thermoelectric materials 114 and 116, 114' and 116', or 128 and 130, as the case may be.

A suitable negative element to cooperate with the aforesaid positive element desirably is composed of a homogeneous solid, as described in the last-mentioned copending application, having the formula $Al_mT_{(1-m)}X$, where T represents one or more of the transition metals and X and $m$ have the values previously given.

Other suitable positive and negative thermoelement components comprise compounds having the formula $MZ_{(1+a)}$ where M represents an element from the group comprising chromium, iron, nickel, cobalt, copper, and manganese, Z represents an element selected from the group including sulfur, selenium, tellurium, arsenic, antimony, and bismuth, and $a$ has a positive value of less than 0.1.

As disclosed in the aforesaid Heikes and Johnston application, highly satisfactory thermoelements can be prepared by combining a metal member fabricated from the group including copper, silver, copper based alloys, silver based alloys, and molybdenum, with a member of any of the aforesaid positive or negative homogeneous inorganic compounds. In this latter arrangement, it is contemplated by the present invention that each of the fuel elements 58, 58', or 58'' be provided with a uniformly laminated casing in place of the casing 108, 108', or 108'', respectively. That is to say these casings can be replaced by a homogeneous cladding or sheath consisting essentially of a metal selected from the group including copper, silver, copper based alloys, silver based alloys and coated directly upon the fuel plate 100, 100', or 100'', respectively. The cladding then is coated with one of the aforesaid homogeneous inorganic compounds. A portion of this cladding is left uncoated to afford an area for making electrical contact therewith, and the coating is provided in turn with an electrically conductive and protective coating if required. The cladding and the first-mentioned coating then comprise the part of thermoelements.

The aforesaid positive and negative thermoelectric elements may be prepared as described in the aforesaid application of Heikes and Johnston or in their copending application entitled Process for Producing Lithium Substituted Transition Metal Oxides and Members Prepared Therefrom, Serial No. 580,856, filed April 26, 1956, and assigned to the present assignee.

In other applications of the invention, a pair comprising one each of the aforesaid positive and negative thermoelectric materials, or other suitable materials of this nature, are disposed in conjunction with a single thermoelectric fuel element 58, 58' or 58'' and, in this example, are connected electrically in a manner such that the cold junctions of the thermoelectric materials are disposed at the exterior surface of the fuel elements while the hot junctions thereof are arranged at the internal surface of the associated fuel element casings 108, 108' or 108''. Accordingly, the hot junctions of the thermopile composed in this manner are each disposed for heating by a fuel plate 100 of each fuel element, and the cold junctions thereof are arranged for cooling by the electrically non-conductive coolant fluid passing through the flow nozzles 28 and 29 and flow passages 86 of the fuel element assembly 20.

When employing the thermoelectric materials described in the last-mentioned copending application, a thermoelectric power of the order of 500 to 1000 microvolts per degree centigrade can be realized for each junction formed between the aforesaid dissimilar materials. These materials have the further advantage that both the ohmic resistivity and the thermoconductivity thereof are extremely low. Specifically, in certain types of such materials, the resistivity of the material is of the order of $10^{-2}$ ohms centimeters, while the thermoconductivity is of the order of only 0.02 watt per centimeter per degree centigrade. It follows then that a relatively large temperature differential that is to say in the order of 500° C. average, can be maintained between the hot and cold junctions of a thermopile formed with these materials and that a relatively large number of thermocouples can be employed therein without excessively increasing the ohmic resistance of the thermopile.

Figure 11:
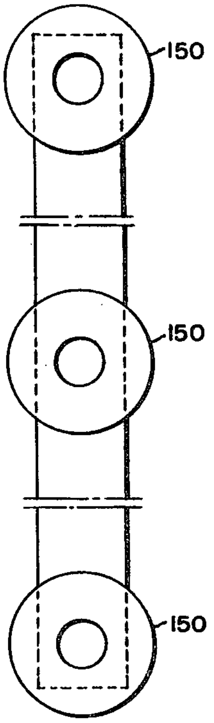
FIG. 11 is a top plan view of the fuel element of FIG. 9.

In place of the fuel element assembly illustrated in FIGS. 3 to 6 of the drawings, the plate type thermoelectric fuel element can be arranged for mounting within the plate type fuel element assembly disclosed in applicant's aforesaid copending application. In this latter arrangement of the invention as illustrated in FIGS. 9 to 11 of the drawings, a fuel plate 100'' is provided with an encapsulating casing layer 102' such as that described in connection with FIGS. 1 and 2 of the drawings. A biparite outer casing layer 108'' is spaced from the encapsulating layer 102' and similarly comprises casing portions 139 and 140. In the latter example of the invention, the outer casing portions 139 and 140 terminate respectively in upper and lower bentover or edge portions 142 and 144. These bentover portions are bonded securely as by evaporation of the metal comprising the outer casing portions 139 and 140 onto the thermoelectric layers 146 and 148 interposed between the encapsulating layer 102′ and the outer casing 108″, or alternatively by ultrasonic brazing thereon.

A plurality of circular block members or thickened portions 150 and 152 are then secured to the ends 124 and 126, respectively, of the fuel element 58′ in a manner such that the junction between these block members and the fuel element 58′ is confined entirely to the outer casing portions 139 and 140, respectively, to avoid short circuiting the casing portions 139 and 140. In this example of the invention, three each of the block members 150 and 152 are secured to the respective ends of the fuel element 58′ and each one is provided with a tapped hole 154 extending centrally thereof and longitudinally of the fuel element 58′. With this arrangement, then, a plurality of fuel elements 58′ are arranged for suspension in a closely ordered array within a plate type fuel element assembly such as that illustrated in FIGS. 8 and 9 of applicant's aforesaid copending application. It will be appreciated, however, that when the fuel elements 58′ are so arranged, the pair of dissimilar thermoelectric materials contained within the casing of each fuel element will be disposed in reversed order relative to that of adjacent fuel elements as described in connection with FIG. 6 of the accompanying drawings, in order to permit the hot and cold junctions of these materials to be coupled in electrical series. It will be obvious then that the cooled junctions of a group of the thermoelectric fuel elements 58′ when arranged in this manner, will be effected through the block members 150 and 152, respectively, and the electrical circuit means disclosed in applicant's aforesaid copending application.

In view of the foregoing disclosure, it will be apparent that novel and efficient forms of a thermoelectric fuel element have been disclosed herein. As indicated heretofore, these fuel elements which are adapted for use in conjunction with neutronic reactors are so arranged for converting at least a portion of the nuclear heat generated by the reactor directly into electrical energy. Although the invention is described and illustrated primarily in connection with a neutronic power reactor, obviously the invention can be adapted for use with conventional heat exchanging means, accordingly, it will be understood that the foregoing detailed description and illustrations thereof is submitted for purposes of exemplifying the invention disclosed herein and are not to be considered as limitative of the invention.

Therefore, numerous modifications of the invention will occur to those skilled in this art without departing from the spirit and scope of the invention. Moreover, it will be obvious that certain features of the invention can be used without a corresponding employment of other features.

Therefore, what is claimed as new is:

1. A thermoelectric fuel element for a neutronic reactor, said element comprising an elongated member consisting essentially of an electrically conducting nuclear fuel material, a pair of thermoelectrically dissimilar members mounted on said elongated member in electrically and thermally conductive relation therewith, each of said dissimilar members being shaped respectively to cover substantially one-half the external surface of said elongated member so that said dissimilar members together substantially enclose said elongated member, said elongated member electrically connecting the adjacent surfaces of said dissimilar members to form a hot thermocouple junction therebetween, a conductive casing member secured to the external surface of each of said dissimilar members in electrically and thermally conductive relation therewith, each of said casing members being shaped to cover substantially the entire external surface of the associated dissimilar member so that said casing members together substantially enclose said elongated member and said dissimilar members, and conductive means secured to each of said casing members for electrically connecting the casing member to a casing member associated as aforesaid with a relatively thermoelectrically dissimilar member of a similar fuel element, to form a cold thermocouple junction therebetween.

2. A thermoelectric fuel assembly for a neutronic reactor, said assembly including a plurality of fuel elements, each of said fuel elements comprising an elongated member consisting essentially of a nuclear fuel material, an electrically conductive casing enclosing said elongated member and disposed in heat transfer relation therewith, a pair of thermoelectrically dissimilar members mounted on said casing in thermally and electrically conductive relation therewith, each of said dissimilar members being shaped respectively to cover substantially one-half the external surface of said casing so that said thermoelectric members together substantially enclose said casing, said casing electrically connecting the adjacent surfaces of said dissimilar members to form a hot thermocouple junction therebetween, an electrically conductive member mounted on the external surface of each of the said dissimilar members in thermally and electrically conductive relation therewith, said conductive member being shaped to cover substantially the entire external surface of the associated dissimilar member so that said conductive members together substantially enclose said elongated member and said dissimilar members, and conductive means secured to each of said conductive members and to a conductive member associated with a relatively thermoelectrically dissimilar member of another of said fuel elements to form a cold thermocouple junction therebetween.

3. A thermoelectric fuel assembly for a neutronic reactor, said assembly including a plurality of elongated fuel elements and means engaging both ends of each said fuel elements for mounting said fuel elements in a substantially parallel spaced array, each of said fuel elements comprising an elongated nuclear fuel member, said fuel member being electrically conductive at least adjacent its external surface, a pair of elongated thermoelectrically dissimilar members mounted on said fuel member in thermally and electrically conductive relation therewith, each of said dissimilar members being shaped to cover substantially one-half the external surface of said fuel member so that said dissimilar members together substantially enclose said fuel member, said fuel member electrically connecting said dissimilar members to form a hot thermocouple junction therebetween, an elongated electrically conductive casing member mounted on the external surface of each of said dissimilar members in thermally and electrically conductive relation therewith, each of said casing members being shaped respectively to cover substantially the entire external surface of the associated dissimilar member, so that said casing members together substantially enclose said dissimilar members and said fuel member, each of said thermoelectric members and said casing members extending longitudinally of said fuel member, a pair of electrically conductive flanges secured respectively to said casing members and overlying the ends respectively of said fuel element, and a plurality of conductive strips positioned on said mounting means and grouped into alternating arrays at the ends respectively of said fuel element array, the conductive strips of each array engaging the flanges of adjacent pairs respectively of said fuel elements so that said strips and said flanges and said casing members form cold thermocouple junctions between relatively thermoelectrically dissimilar members of adjacent pairs of said fuel elements and so that said fuel elements thereby are connected in thermoelectric series throughout said fuel assembly.

4. An energy converter comprising a plurality of elongated generally tubular heat exchange casings and means for mounting said casings in a generally parallel spaced array, said casings being fabricated from an electrically conducting material, each of said casings having a pair of thermoelectrically dissimilar members mounted thereon in electrically and thermally conductive relation therewith, each of said dissimilar members being shaped respectively to cover substantially one-half the external surface of the casing so that the dissimilar members mounted on the casing substantially enclose said casing, said casing electrically connecting the adjacent surfaces of the associated dissimilar members to form one of hot and cold thermocouple junctions therebetween, and conductive means electrically contacting the opposed surface of each of said dissimilar members and a surface of a relatively thermoelectrically dissimilar member of another of said casings to form the other of said hot and cold junctions therebetween.

5. An energy converter comprising a plurality of elongated generally tubular heat exchange casings and means for mounting said casings in a generally parallel spaced array, said casings being fabricated from an electrically conducting material, each of said casings having a pair of thermoelectrically dissimilar members mounted thereon in electrically and thermally conductive relation therewith, each of said dissimilar members being shaped respectively to cover substantially one-half the external surface of the casing so that the dissimilar members mounted on the casing substantially enclose said casing, said casing electrically connecting the adjacent surfaces of the associated dissimilar members to form one of hot and cold thermocouple junctions therebetween, and conductive means electrically contacting the opposed surface of each of said dissimilar members and a surface of a relatively thermoelectrically dissimilar member of another of said casings to form the other of said hot and cold junctions therebetween, the conductive means of each casing substantially covering said opposed surfaces respectively of the associated thermoelectric members so that the last-mentioned conductive means substantially enclose said dissimilar members.

References Cited in the file of this patent

UNITED STATES PATENTS

| | | |
|---|---|---|
| 529,711 | Cox | Nov. 27, 1894 |
| 546,417 | Cox | Sept. 17, 1895 |
| 724,572 | Hall | Apr. 7, 1903 |
| 928,089 | Vokel | July 13, 1909 |
| 1,664,720 | Woodruff | Apr. 3, 1928 |
| 2,456,070 | Malek et al. | Dec. 14, 1948 |
| 2,734,344 | Lindenblad | Feb. 14, 1956 |
| 2,811,568 | Lloyd | Oct. 29, 1957 |
| 2,902,423 | Luebke et al. | Sept. 1, 1959 |

FOREIGN PATENTS

| | | |
|---|---|---|
| 618,508 | Great Britain | Feb. 23, 1949 |

OTHER REFERENCES

The Physical Review, vol. III, No. 6, September 15, 1958, pp. 1493–1496.

The British Journal of Applied Physics, vol. 8, 1957, pp. 179–189.

TID–7515 (Part 2), August 1956, pp. 197, 273, 292, 294.